United States Patent
Phillips et al.

(10) Patent No.: US 7,272,564 B2
(45) Date of Patent: Sep. 18, 2007

(54) METHOD AND APPARATUS FOR MULTIMODAL COMMUNICATION WITH USER CONTROL OF DELIVERY MODALITY

(75) Inventors: W. Garland Phillips, Arlington, TX (US); Dwight Randall Smith, Grapevine, TX (US)

(73) Assignee: Motorola, Inc., Schaumburg, IL (US)

( * ) Notice: Subject to any disclaimer, the term of this patent is extended or adjusted under 35 U.S.C. 154(b) by 183 days.

(21) Appl. No.: 10/105,097

(22) Filed: Mar. 22, 2002

(65) Prior Publication Data

US 2003/0182125 A1 Sep. 25, 2003

(51) Int. Cl.
G06F 17/30 (2006.01)
(52) U.S. Cl. .................... 704/270.1; 709/206
(58) Field of Classification Search ............. 704/270.1, 704/206, 270, 275
See application file for complete search history.

(56) References Cited

U.S. PATENT DOCUMENTS

| | | | |
|---|---|---|---|
| 4,975,957 A * | 12/1990 | Ichikawa et al. | 704/220 |
| 5,280,516 A | 1/1994 | Jang | |
| 5,381,466 A | 1/1995 | Shibayama et al. | |
| 5,724,410 A * | 3/1998 | Parvulescu et al. | 379/88.18 |
| 5,870,549 A | 2/1999 | Bobo, II | |
| 6,085,239 A | 7/2000 | Kubo et al. | |
| 6,363,414 B1 * | 3/2002 | Nicholls et al. | 709/206 |
| 6,411,685 B1 * | 6/2002 | O'Neal | 379/88.14 |
| 6,446,041 B1 * | 9/2002 | Reynar et al. | 704/260 |

FOREIGN PATENT DOCUMENTS

| | | | |
|---|---|---|---|
| EP | 1 022 670 A2 | 7/2000 | |
| WO | WO99/07131 | * 11/1999 | |
| WO | WO 01/01373 | * 1/2001 | |
| WO | WO 01/75582 | * 10/2001 | 725/1 |

OTHER PUBLICATIONS

Harry Newton, "Newton's Telecom Dictionary," Flatiron Publishing, Mar. 1998, pp. 119-120.*
Maes, Stephane H., IBM Research, Human Language Technologies: Multi-modal Web IBM Position, W3C/WAP Workshop, Mobile Speech Solutions & Conversational AdTech ( pp. 1-9).

* cited by examiner

Primary Examiner—Donald L. Storm
(74) Attorney, Agent, or Firm—Vedder, Price, Kaufman & Kammholz P.C.

(57) ABSTRACT

A method and apparatus for providing multimodal communication outputs information, such as retrieved content, in a first modality. An output modality change command is generated, such as via a multimodal user input interface, or other suitable mechanism. A multimodal communication apparatus and method then reprovides the previously output information as reprovided information in a different output modality in response to receiving the output modality change command. Accordingly, a user or unit may have content delivered in one modality and redelivered in a different preferred modality or modalities. Accordingly, a user or device may request output modalities dynamically so that content can be delivered using a different user preference after the content has already been provided in a first modality.

9 Claims, 5 Drawing Sheets

METHOD AND APPARATUS FOR MULTIMODAL COMMUNICATION WITH USER CONTROL OF DELIVERY MODALITY

BACKGROUND OF THE INVENTION

The invention relates generally to communication methods and apparatus and more specifically to multimodal communication methods and apparatus. An emerging area of technology involving communication units, also known as terminal devices, such as handheld devices, mobile phones, laptops, PDAs, internet appliances, non-mobile devices or other suitable device, is the application of multi-modal interactions for access to information and services. Typically resident on the terminal device is at least one browser, wherein the browser is an application or other mechanism which responds to fetch requests (entered by a user through an interface or from another device or application), receives fetched information, navigates through content servers via internal, e.g. intranet, or external, e.g. internet, connections, and presents information to the user. The browser may be a graphical browser, voice browser, or any other suitable browser as recognized by one of ordinary skill in the art. Such browsers may include but are not limited to J2ME applications, Java applications or any suitable mechanism.

Multi-modal technology allows a user to access information, such as voice, data, video, audio or other information, and services such as email, weather updates, bank transactions, and news through one or more browsers. More specifically, the user may submit an information fetch request in one or more modalities, such as speaking a fetch request into a microphone, and the user may then receive the fetched information in the same mode (i.e., voice) or a second mode, such as viewing the information on a display screen. Within the terminal device, the browser works in a manner similar to a standard web browser or other suitable application resident on a device connected to a network or to other terminal devices.

As such, multimodal communication systems are being proposed that may allow users to utilize one or more input and output interfaces to facilitate communication in a plurality of modalities on a per session basis. For example, a user may wish to use a different modality in different circumstances. For example it may be desirable to input a request via a tactile interface on a communication device, such as a portable or non-portable device such as desktop units, hand held Internet appliances, mobile telephones, PDAs or any other suitable device in the form of text and receive retrieved information in an audio format such as voice. Specifying such input and output modality preferences each time a user is in a communication session can be time consuming and potentially complicated.

Proposed multimodal systems include a system choosing input and output modes for a user so that the output mode of information is predefined by the system. However, where information is output, for example, in an audible mode and a user is in a loud environment, the audible output may not be heard by a user. In other cases, input or output of special information, such as PINs or passwords, may require use of alternative modalities to avoid compromising the information. In addition, the proposed multimodal systems allow a user to choose the input modality but do not typically provide the capability for the user to change an output modality of information once it has already been received by the user. With such systems, when a server delivers desired content, the server or system may choose the mode but the user may wish the output mode to be different from that chosen by the server.

Other proposed systems allow a device to describe the capability of the device to the system so the server can decide how to provide any retrieved information back to the device. As such, a client device may have a preference profile. However, such systems do not typically provide for user control of output modality once an output modality has been selected.

Accordingly, a need exists for a multimodal apparatus and method that facilitates selection of an output modality.

BRIEF DESCRIPTION OF THE DRAWINGS

The present invention is illustrated by way of example and not limitation in the accompanying figures, in which like reference numerals indicate similar elements, and in which.

DETAILED DESCRIPTION OF THE PREFERRED EMBODIMENT

Briefly, a method and apparatus for providing multimodal communication outputs information, such as retrieved content, in a first modality. An output modality change command is generated, such as via a multimodal user input interface, or other suitable mechanism. A multimodal communication apparatus and method then reprovides the previously output information in a different modality in response to receiving the output modality change command. Accordingly, a user or unit may have content delivered in one modality and redelivered in a preferred modality or modalities. Accordingly, a user or device may request output modalities dynamically so that content can be delivered using a different user preference after the content has already been provided in a first modality.

Figure 1:
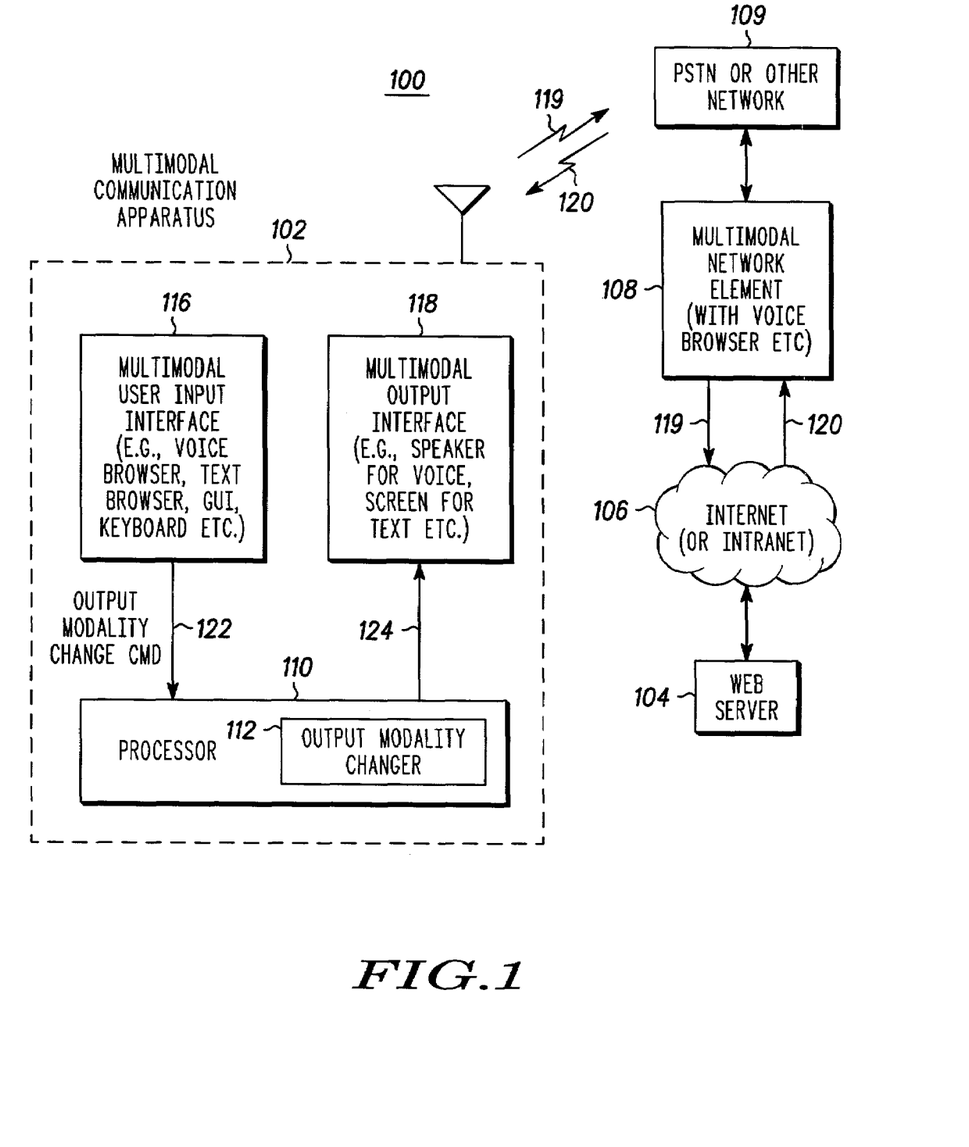
FIG. 1 is a block diagram illustrating one example of an apparatus for providing multimodal communication in a multimodal communication system in accordance with one embodiment of the invention.

FIG. 1 illustrates a multimodal communication system 100 that includes a multimodal communication apparatus 102 that is in communication with a Web server 104 via the Internet 106. In this particular embodiment, the multimodal communication apparatus 102 includes telephonic capability and therefore may communicate through a PSTN 109 or other network which is coupled to a multimodal network element 108 which in turn is linked through any suitable mechanism to the Internet 106, or intranet or any other suitable network. It will be recognized that although the invention will be described with reference to an application involving the Internet, that the invention is equally applicable to systems employing intranets and other non-Internet communication systems.

The multimodal communication apparatus 102 in this example is a wireless multimodal communication apparatus However, the term "apparatus" as used herein also includes a cooperating set of apparatus, each which may support limited modalities of input or output approaches, together providing a multimodal environment. Such a multimodal communication apparatus may include one or more devices such as a wireless internet appliance, cellular telephone, PDA, automobile based devices or any other suitable unit. For example, a PDA may be used to output in a text modality whereas a wireless internet appliance may be used to output information in a voice modality. It will also be recognized that the multimodal communication apparatus 102 includes using a non-wireless device or combination of wireless and non-wireless devices if desired. The Web server 104 may be any suitable information provider or content provider which, for example, invokes an application to return a response to an information request sent by the multimodal communication apparatus 102.

The multimodal communication apparatus 102 includes one or more processors 110, such as microprocessor, DSP, microcomputer or any suitable processing device and associated memory. In this example, the memory includes executable instructions that when executed by one or more processors 110, causes the one or more processors to act as an output modality changer 112. The multimodal communication apparatus 102 also includes a multimodal user input interface 116, such as a voice browser, text browser, graphics user interface, keyboard, or any other suitable multimodal user input interface, and a multimodal output interface 118 such as a speaker to output audio (e.g., voice), a screen to output text, a voice browser to output voice through the speaker, or any other suitable multimodal output interface that can output information in more than one modality. The multimodal output interface has a plurality of different output modes including at least an audible output and a visual output and as such includes, for example, a text browser, voice browser, speaker, a screen for providing text, or any other suitable output information interface. As noted above, in this example, the processor 110 is a processing circuit that executes instructions that when executed causes the processing circuit to carry out the operations described herein. However, the processor 110 may also be a state machine, logic or any suitable combination of hardware and software. The blocks shown are functional blocks and as such it will be recognized that the multimodal user input interface 116 and output interface 118 or portions thereof, such as a Web browser, may be software applications executed via processor 110 executing suitable software.

The multimodal network element 108 may be, for example, a voice gateway which includes, for example, a voice browser which provides or receives voice XML pages, .wav files, MP3 files or other suitable audible files. The voice browser outputs the information to the PSTN 109 or other network for the multimodal communication apparatus 102.

Preferably, although not necessary, the information or content received by the multimodal communication apparatus 102 is in modality independent form which is sometimes referred to as device independent markup language format. This modality independent format contains information that could be rendered in one of many formats, such as through a transformation process. As such, the information may be rendered in various modalities internally by the multimodal communication apparatus 102. However, for purposes of illustration, it will be assumed that the content obtained from the Web server 104 is in a modality dependent form based on an information request or browser request from the multimodal communication apparatus 102.

In operation the multimodal communication apparatus 102 sends an information request 119 for content which is passed through the multimodal network element 108 to the Web server 104 via the Internet 106 using known methods. The requested information 120 is then provided by the Web server 104 in an appropriate first modality format. In response to the information request 119, the multimodal network element 108 outputs the requested information 120 in a first modality, such as voice, so that the requested information 120 destined for the multimodal communication unit is supplied in a first modality, in this example, in a voice mode. For example, if the multimodal communication apparatus 102 includes a telephone function and calls the multimodal network element 108 via a phone number. The multimodal network element 108 via the voice browser may speak a menu which is then sent to the multimodal communication apparatus 102 for output by the multimodal output interface 118. For example, the multimodal network element 108 may speak a menu stating "weather, traffic, airline flight information, or other information". A user may then audibly request specific flight information by speaking into the multimodal user input interface 118 and may, for example, speak the letters "AA60" signifying American Airlines Flight 60. This serves as the information request 119. The multimodal network element 108 then communicates with the Web server 104 requesting the specific flight information associated with "AA60" and likely receives the information in a text format such as HTML or VoiceXML format and the multimodal network element then translates the information to voice format since the voice modality was the first format used by the multimodal network element 108 and multimodal communication apparatus 102. The first modality may be, for example, chosen by a user when the user speaks into the device or the system may initially choose the output modality for a given user based on system limitations. In addition, the initial information request 119 may have data contained therein indicating the desired output modality.

Once the multimodal network element 108 retrieves the information based on the information request 119, the multimodal network element 108 outputs the requested information 120, in this example, in a voice format to the multimodal communication apparatus 102. The multimodal network element 108 provides the requested information 120 in the first modality to the multimodal communication apparatus 102. In this example, the information may be that the multimodal network element 108 speaks that "AA60departs gate 23, Terminal A at 1:00 P.M." Since the multimodal communication apparatus 102 is already in a voice modality, this information is output via a speaker, for example, by a voice browser in the multimodal output interface 118. Accordingly, the multimodal communication apparatus 102 outputs requested information in the first modality, namely, the voice modality as provided by the multimodal network element 108.

However, since the user does not wish to have the requested information 120 output in audible form since, for example, the user may be in a loud environment, the user in this example via the multimodal user input interface 116 selects, for example, a GUI button or speaks into the multimodal user input interface 116 the words "send to screen". The activation of the GUI button or the voice command to send the requested information to the screen is interpreted by the processor 110 to be an output modality change command 122. Accordingly, the multimodal input interface 116 generates the output modality change command 122 which is received by the processor 110. The output modality changer 112 then reprovides the information in a different modality in response to receiving the output modality change command 122. For example, the output modality changer 112 translates the voice information "AA60 departs Gate 23, Terminal A at 1:00 P.M." into a text format which is a different modality and reprovides the requested information 120 as changed modality information 124 to the multimodal output interface 118 so that the translated information can then be output in text form as opposed to audible form as originally provided by the multimodal communication apparatus 102. As such, the multimodal communication apparatus 102 interprets the output modality change command 122 and generates (or translates) the information to be output in the requested modality internal to the multimodal communication apparatus 102. For example, a device independent markup language may contain content as well as instructions on how to present or render the content via various modalities. Alternatively, the multimodal communication apparatus 102 may be capable of transforming generic content by adding presentation information such that it can be understood by a GUI browser, for example. This may involve adding HTML markup such as title and paragraph tags and other such markup. Accordingly, although the multimodal communication apparatus 102 initially outputs information in a first modality such as voice, the user in this example can effectively request that the information subsequently be output in a different modality and the processor 110 via the output modality changer 112 will reformat the information to be output in a different modality such as in a text format.

The output modality changer 112 may be a suitable software algorithm or may be any suitable discrete logic or combination of hardware and software as desired.

Figure 2:
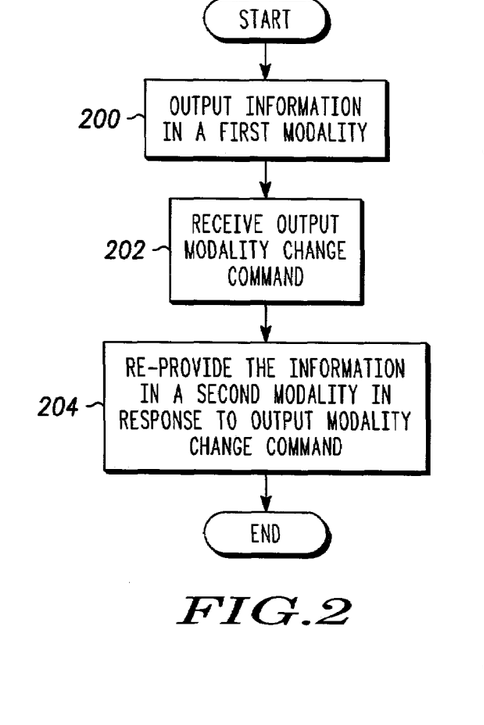
FIG. 2 is a flow chart illustrating one example of a method of multimodal communication in accordance with one embodiment of the invention.

Accordingly, as shown in FIG. 2, a method of multimodal communication includes outputting of information in the first modality as shown in block 200 such as by the multimodal communication apparatus 102 or by the multimodal network element 108. In this example, the first modality is a voice modality. As shown in block 202, the method includes receiving the output modality change command 122, such as by the processor 110 or other suitable logic. As shown in block 204, the method includes reproviding the same information in a second modality, such as text, in response to detecting the output modality change command 122. The reprovided information 124 is in a format that is output via the multimodal output interface 118.

Figure 3:
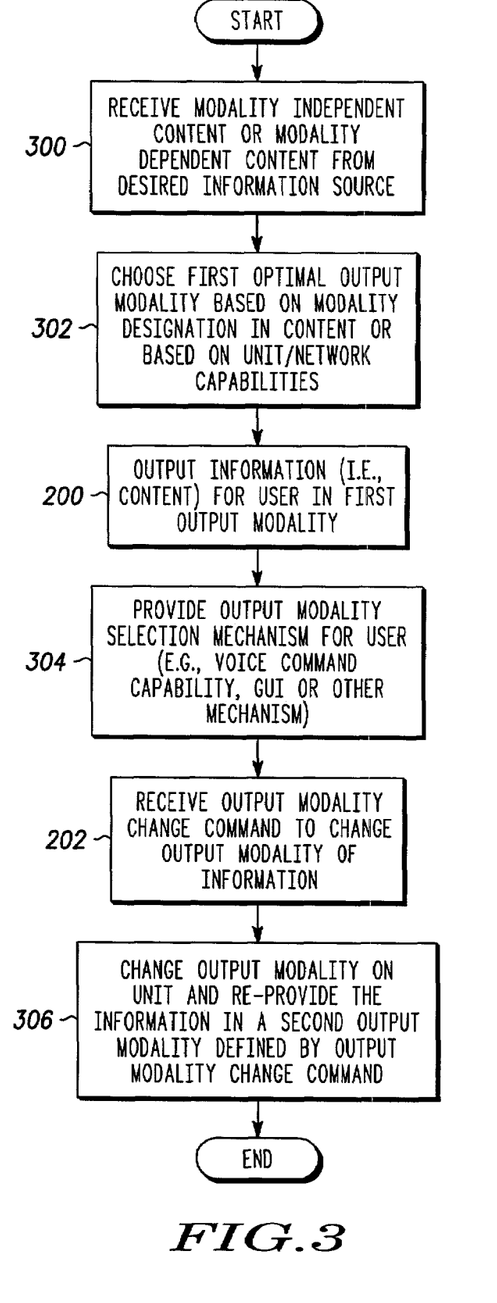
FIG. 3 is a flow chart illustrating one example of a method of multimodal communication in accordance with one embodiment of the invention.

FIG. 3 illustrates in more detail an example of a method of multimodal communication which includes in block 300 receiving modality independent content or modality dependent requested information 120 from a desired information source, such as the Web server 104. As shown in block 302, the method includes choosing the first optimal output modality based on a modality designation within the requested information 120 or based on the communication apparatus 102 capabilities and/or network capabilities. For example, the system 100 may determine that the first output modality should be voice via the multimodal network element 108 since the multimodal network element 108 may receive the information request 119 in a voice mode and assumes therefore that the requested information 120 should also be output to the multimodal communication apparatus 102 in the same mode. As such, there may be modality designation information within the information request 119 or the system may assume that any requested information is output in the same modality as the request. Alternatively, the system may be more sophisticated and the multimodal communication apparatus 102 may send with the information request 119 limits as to the type of modalities that the multimodal communication apparatus 102 can output (or the desired modality) since not all multimodal communication devices may have all modality capabilities. Moreover, the Web server 104 may not be able to provide information in a particular modality and the multimodal network element 108 may then have to translate any received text information from the Web server into voice information if the output information is to initially be provided in a voice modality.

Once the first modality is determined for outputting the requested information 120, the method includes outputting the requested information in the first output modality as shown in block 200. As shown in block 304, the method includes providing output modality selection mechanism for a user of the multimodal communication apparatus 102 so that the user may select an alternative output modality. As noted above, this may include, for example, providing the multimodal user input interface 116 as a graphic user interface with a selection button indicating a change in output modality. Alternatively, the multimodal user input interface 116 may be set in a voice command mode wherein the output modality change command is a voice command by the user and the processor 110 then interprets the voice command to be an output modality change command 122. As such, the processor 110 is suitably programmed to provide an output modality change command 122 based on the received voice command. Once the output modality selection mechanism is provided to a user, the method includes as shown in block 202, receiving the output modality change command 122 to change the output modality of the requested information 120. As shown in block 306, the method includes changing the output modality on the multimodal communication apparatus 102 to reprovide the requested information 120 as reprovided information 124 in a different output modality defined by the output modality change command 122. Changing the output modality on the multimodal communication apparatus 102 includes, for example, outputting the reprovided information 124 in a text format on a screen instead of a voice format, where for example the information is received in a device independent format. Providing the requested information 120 in a different output modality includes the output modality changer 112 translating the information to another format to enable output in the second modality where the requested information 120 is in a device dependent format.

Accordingly, in one embodiment with respect to FIG. 1 where the requested information is a device independent format, the multimodal communication apparatus 102 outputs requested information 120 in the first modality such as in a voice mode. The processor 110 then receives an output modality change command 122 via the multimodal user input interface 116 to change the output modality for the requested information 120. The multimodal communication apparatus 102 then reprovides the requested information 120 in a different modality as reprovided information 124 in response to the output modality change command 122. In this example, the first modality, namely the voice mode, is used by the user to initiate the information request 119 which serves as a command to obtain information.

Figure 4:
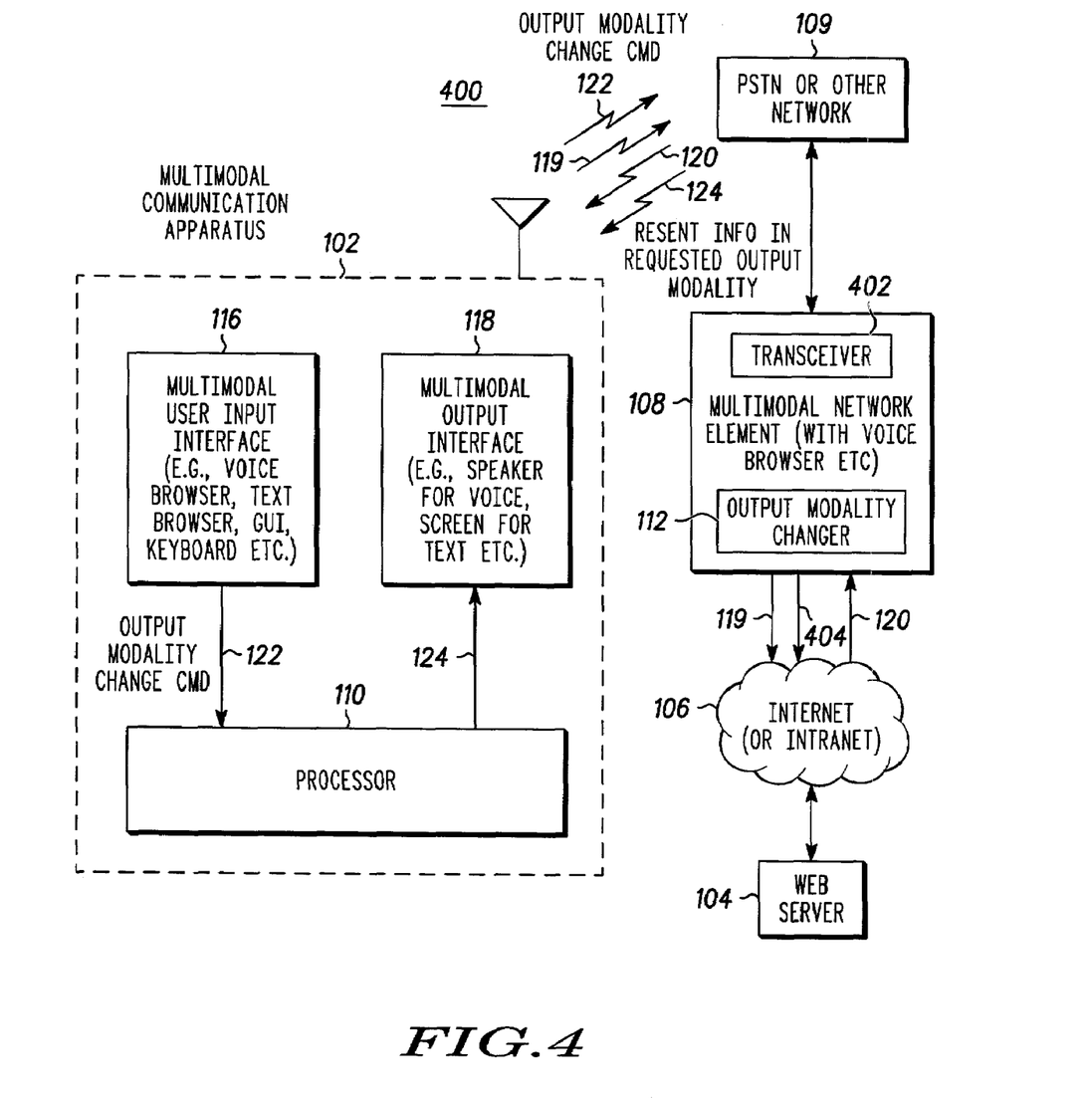
FIG. 4 is a block diagram illustrating another example of an embodiment of an apparatus for providing multimodal communication within a multimodal communication system.

FIG. 4 is an example of an alternative embodiment of a multimodal communication system 400 wherein the output modality changer 112 has been moved to the network side of the system so that the multimodal communication apparatus 102 does not require the output modality changer 112. This may be desirable when the information is in a device dependent format. Instead, the multimodal network element 108 is shown to include the output modality changer 112. It will be recognized, however, that the output modality changer 112 need not be part of the multimodal network element 108 but may be a third party device or can be located at any suitable location within the system 400. The multimodal network element 108 includes a transceiver 402 which is also present in the multimodal network element of FIG. 1 but not shown. The transceiver 402, as known in the art, sends and receives information via a suitable link to the PSTN or other network.

In this embodiment, the multimodal communication apparatus 102 does not interpret the output modality change command 122, but instead sends the output modality change command 122 to the multimodal network element 108. The output modality changer 112 then responds to the output modality change command 122 and translates the requested information 120 to be output and provides the resent information 124 in the requested output modality which then is forwarded as shown by line 124 back to the multimodal communication apparatus 102.

Figure 5:
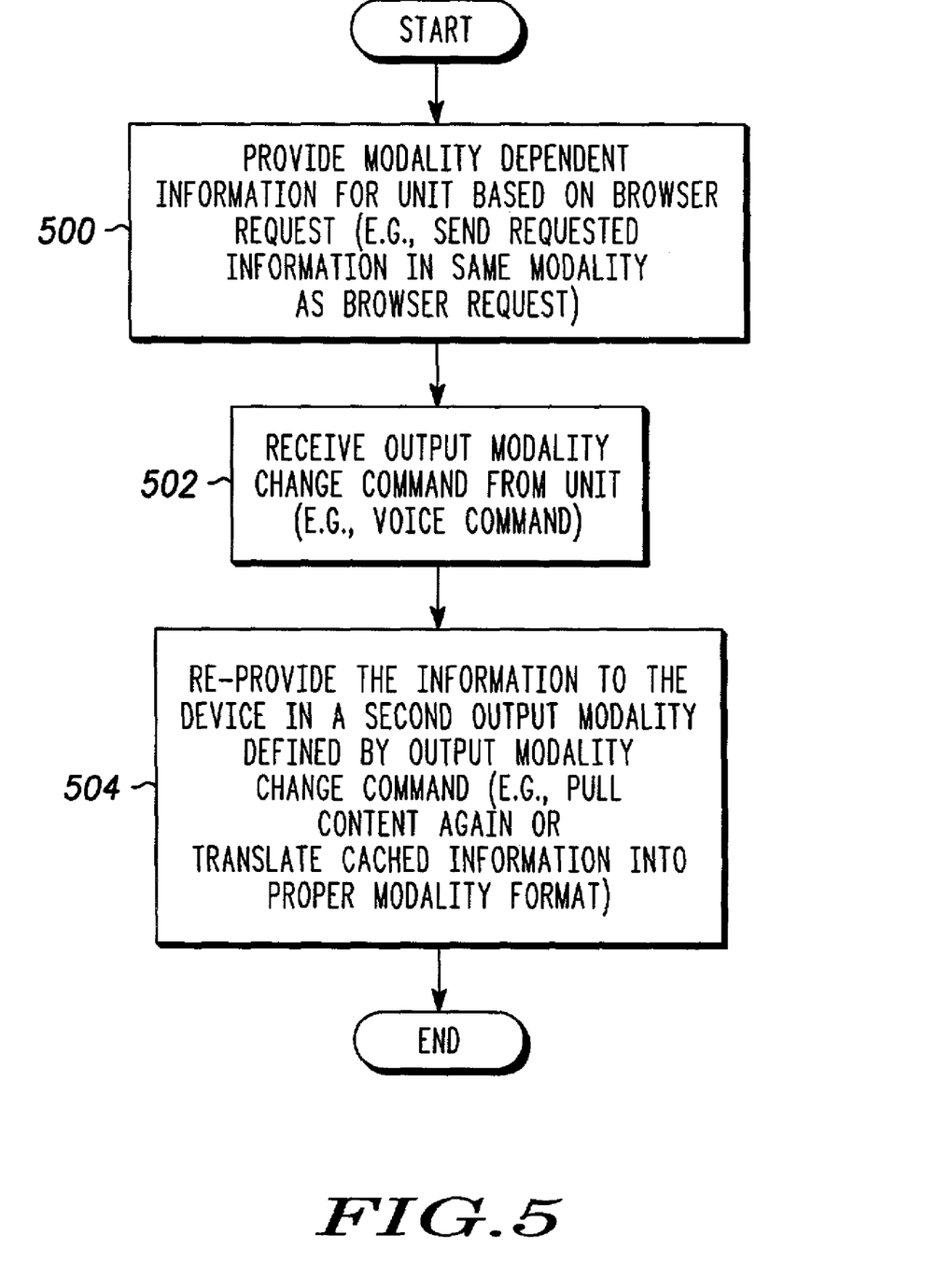
FIG. 5 is a flow chart illustrating one example of a method of multimodal communication carried out, for example, by the apparatus shown in FIG. 4.

Referring to FIG. 5, a method of multimodal communication is illustrated, for example, as carried out by the multimodal network element 108 of FIG. 4. As shown in block 500, the method includes providing modality dependent information for the multimodal communication apparatus 102 based on a browser request (i.e., the information request 119) from the multimodal communication apparatus 102. The browser request, also referred to as the information request 119, is then forwarded to the Web server 104 via the multimodal network element 108. The requested information 120 is then sent back to the multimodal communication apparatus 102 as previously described and output in the first modality by the multimodal communication apparatus 102.

Once the user decides that a different modality is desired, the user may, for example, speak a voice command into the multimodal user input interface 116 indicating a change in output modality. Hence, the voice command serves as the output modality change command 122. In this embodiment, the multimodal communication apparatus 102 instead of internally processing the output modality change command 122 forwards it to the multimodal network element 108. As such, as shown in block 502, the multimodal network element 108 receives the output modality change command 122 from the multimodal communication apparatus 102. The output modality changer 112 then determines the desired output modality and in this example, the new and different output modality that the user requested will be assumed to be text format.

After the multimodal network element 108 receives the output modality change command 122 the multimodal network element 108 then reprovides the information in a second modality by resending the information in a second modality 124 for output by the multimodal communication apparatus 102. This is shown in block 504. The reproviding may be carried out by the multimodal network element 108 by pulling the desired content again from the Web server 104 requesting it in the second modality format, where the information is in a modality dependent form. Also, the multimodal network element 108 may retrieve the information again from an internal cache and translate the information into the second modality format. This may be performed by the output modality changer 112. Accordingly, the output modality changer 112 may analyze cache memory to determine whether the desired information is local to the network element 108 and if not, send another request 404 to the Web server 104 that contains the information to re-obtain the information in a different modality or since it is no longer resident in the cache to obtain it for translation by the output modality changer 112.

By way of further illustration, with a voice over circuit switched connection, a user sends the output modality change command 122 via a voice interface, namely the multimodal user input interface 116 and speaks for example, "re-send to display," which command is then sent to the multimodal network element 108 containing a network voice browser. The multimodal network element 108 then has the necessary addressing information for the user display which may be sent, for example, a priori if desired. Content is then pushed via, for example, a WAP push or a alternatively a URL may be delivered, via WAP Push for example, for immediate retrieval and display by the device, if desired.

With voice over IP (VOIP), the interaction with the multimodal network element 108 is via VOIP. The data path is therefore known and the context need not have provisioned addressing information. The content is pushed as noted above or by other techniques. For the cases in which the voice and display modalities are part of the same device or sufficiently interconnected, and since the data path is known, the user may request rendering on the display via a user interface on the display. The request then gets routed to the appropriate destination and the requested content is returned to the device.

Where a device independent markup language is used, the user request to change the output modality may be handled internally by the multimodal communication apparatus 102. As such, the request for the modality change need not be sent to the network since the content for all modalities is already available at the device. If any pieces of the content need to be retrieved, such as large graphic or video files, the device may retrieve this information after the user has requested the corresponding modality. It will be recognized that certain portions of the desired information need not be sent until the change in output modality has been requested.

Figure 6:
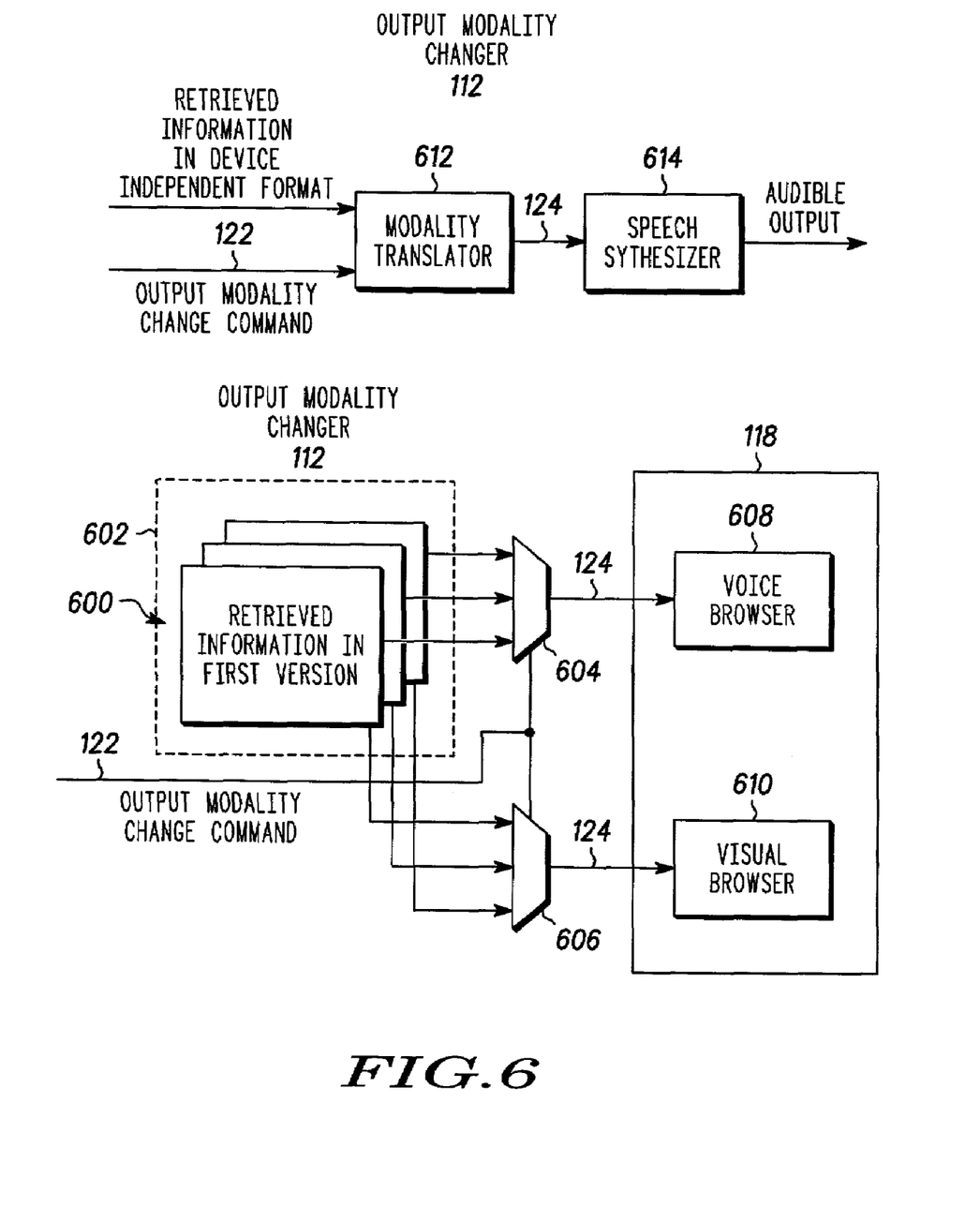
FIG. 6 is a block diagram illustrating one example of an output modality changer in accordance with one embodiment of the invention.

FIG. 6 functionally illustrates two examples of an output modality changer 112 implemented in this example as a suitably programmed processing device, such as but not limited to a microprocessor, DSP, microcomputer or any other suitable device. In addition, the output modality changer 112 may be implemented as logic circuitry including but not limited to state machines, discrete logic circuits or a combination of hardware and software. In one example, several different versions 600 of the retrieved content are delivered to the output modality changer 112, such as by the multimodal network element 108, so that any one version is complete for a given modality and temporarily stored in a database 602. Hence the multimodal network element 108 or the multimodal communication apparatus 102 retrieves the information, or portions thereof, in another format to enable output in the second modality. Information selectors 604 and 606 (shown as multiplexers), such as database data retrievers, select one of the versions 600 to be output via the multimodal output interface 118 either audibly through a voice browser 608 or through visual browser 610. The multimodal communication apparatus 102 or multimodal network element 108 can easily pick one of the versions 600 based on the change modality command 112 and render it or send it. For example a voice based format version and text based format version are stored for use by the output modality changer 112 and if the modality change command 122 indicates that a voice mode is required, the voice based version is selected for output to the user.

Alternatively, the retrieved content 120 can be delivered in a device independent format such as a very generic fashion with some simple presentation instructions to a modality translator 612 such as translator algorithm. In this case, the output modality changer 112 takes the generic content and performs a translation to the desired output modality as defined by the modality change command 122 and the presentation instructions that define how to present the information. This may involve speech synthesis or enunciation when going to voice mode from a text mode such that a speech synthesizer 614 receives the information from the modality translator to convert the information into audible output. For example, the output modality changer 112 may take generic textual content and transform it to VoiceXML which can then be enunciated by a VoiceXML handler.

The above methods and apparatus enable a device to have content redelivered in a different output modality after it has already been output in a first modality in the event a user desires a change in output modality. This can be done on a dynamic basis, such as on a per session basis if desired. In one example, when a browser in a network is capable of handling voice modality, a user request for modality change may be transmitted to the network. Functionally, the voice browser in the network interprets the voice command indicating a change in modality and the content is resent for rendering on a display of the multimodal communication device. The request is the multimodal change command indicating to deliver the same information in a different modality.

Accordingly, the apparatus and methods provide for changing to a different output modality after information has been output in a first modality. This can provide, among other advantages, an improved user experience and improved information provision for multimodal communication systems. Other advantages will be recognized by those skilled in the art.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method of multimodal communication comprising:
    outputting information for output to a user in a first output modality of a plurality of multimodal output modalities;
    receiving a user provided output modality change command; and
    re-providing the information for output to the user in a second output modality of the plurality of multimodal output modalities in response to receiving the output modality change command wherein the plurality of multimodal output modalities includes at least an audible modality and a visual modality; and wherein;
    outputting information in a first output modality includes outputting, by a network element remote from a first unit, information destined for the first unit for output to the user in the first output modality;
    wherein receiving an output modality change command includes receiving, by the network element, the output modality change command; and
    wherein re-providing the information in the second output modality includes, resending, by the network element, the information for output to the user in the second output modality destined for the first unit wherein the second output modality is different from the first output modality.

2. The method of claim 1 wherein resending, by the network element, the information in the second modality for output by the first unit, includes analyzing cache memory to determine whether the information is local to the network element and if not local, sending another request to a web server containing the information.

3. The method of claim 1 wherein re-providing the information in the second output nodality includes, translating the information to another format to enable output in the second output modality.

4. A network element for providing multimodal communication comprising:
    means for outputting requested information to a remote device in a first output modality of a plurality of multimodal output modalities for a user; and
    means, reponsive to an output modality change command, received from the remote device, for re-providing the information in a different and second output modality of the plurality of multimodal output modalities, for the user, wherein the plurality of multimodal output modalities includes at least an audible modality and a visual modality.

5. The network element of claim 4 wherein the means for re-providing the information in a second output modality includes a processing circuit operative to execute instructions that when executed cause the processing circuit to facilitate re-providing of the information in a second output modality for the user.

6. The network element of claim 4 wherein the means for re-providing the information in the second output modality translates the information to another format to enable output in the second modality.

7. The network element of claim 4 wherein the means for re-providing the information in the second output modality select the information, in a second format to enable output in the second output modality.

8. The network element of claim 4 wherein the means for re-providing the information in the second output modality retrives the information, or portions thereof, in another format to enable output in the second modality.

9. A method of multimodal communication comprising:
    outputting information for output to a user in a first output modality of a plurality of multimodal output modalities;
    receiving a user provided output modality change command;
    re-providing the information for output to the user in a second output modality of the plurality of multimodal output modalities in response to receiving the output modality change command;
    outputting information in a first output modality includes outputting, by a network element, remote from a first unit, information destined for the first unit for output to the user in the first output modality;
    wherein receiving an output modality change command includes receiving, by the network element, the output modality change command;
    wherein re-providing the information in the second output modality includes, resending, by the network element, the information for output to a user in the second output modality destined for the first unit; and
    wherein outputting information in a first output modality includes outputting information as at least one of a visual output and audible output and wherein re-providing the information in a second modality in response to receiving the output modality wherein the different modality is at least one of a visual output and an audible output.

* * * * *